Figure 1:
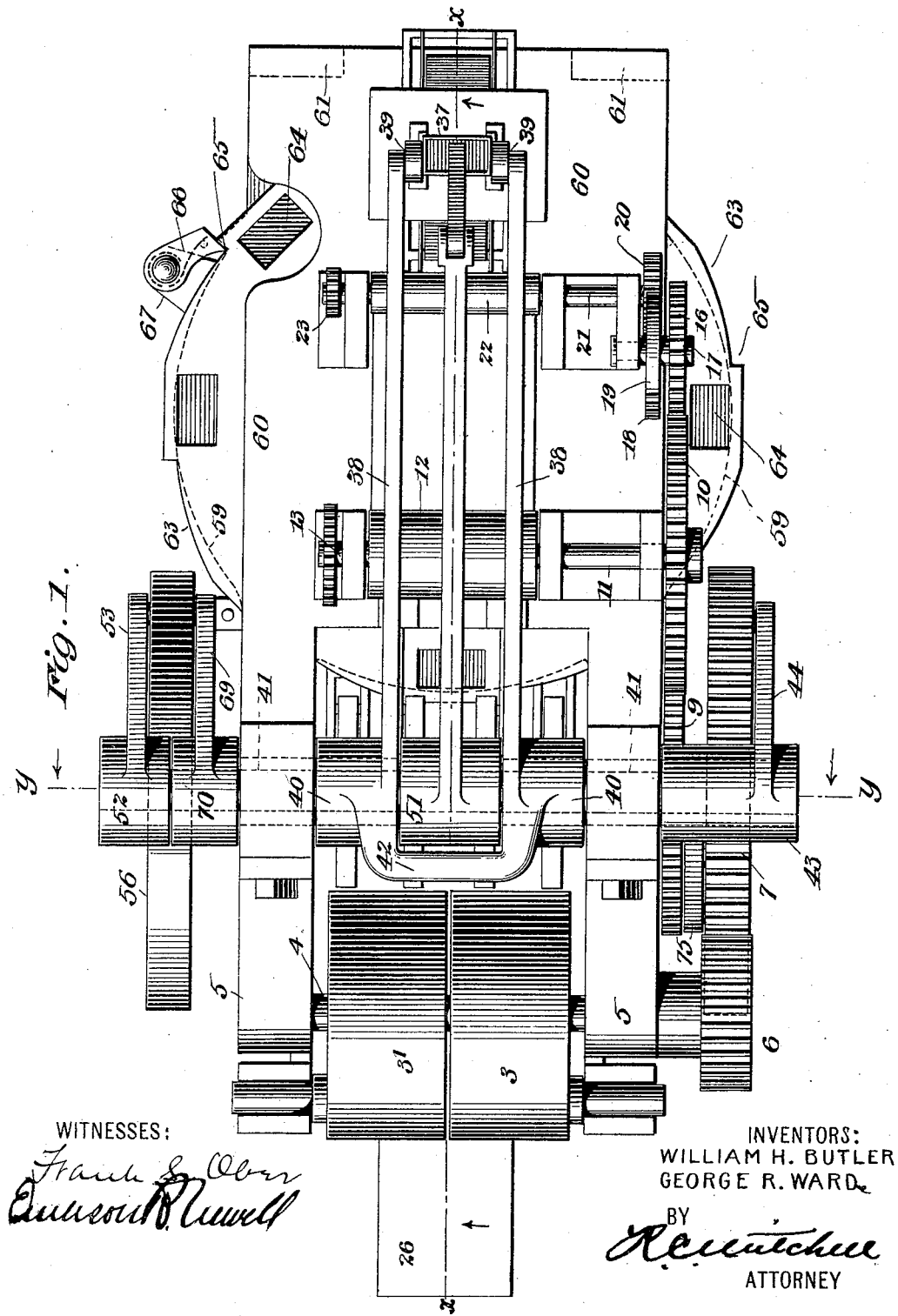

No. 646,355. Patented Mar. 27, 1900.
W. H. BUTLER & G. R. WARD.
BAG MAKING AND FILLING MACHINE.
(Application filed Sept. 8, 1898.)

(No Model.) 9 Sheets—Sheet 1.

WITNESSES:

INVENTORS:
WILLIAM H. BUTLER
GEORGE R. WARD
BY
ATTORNEY

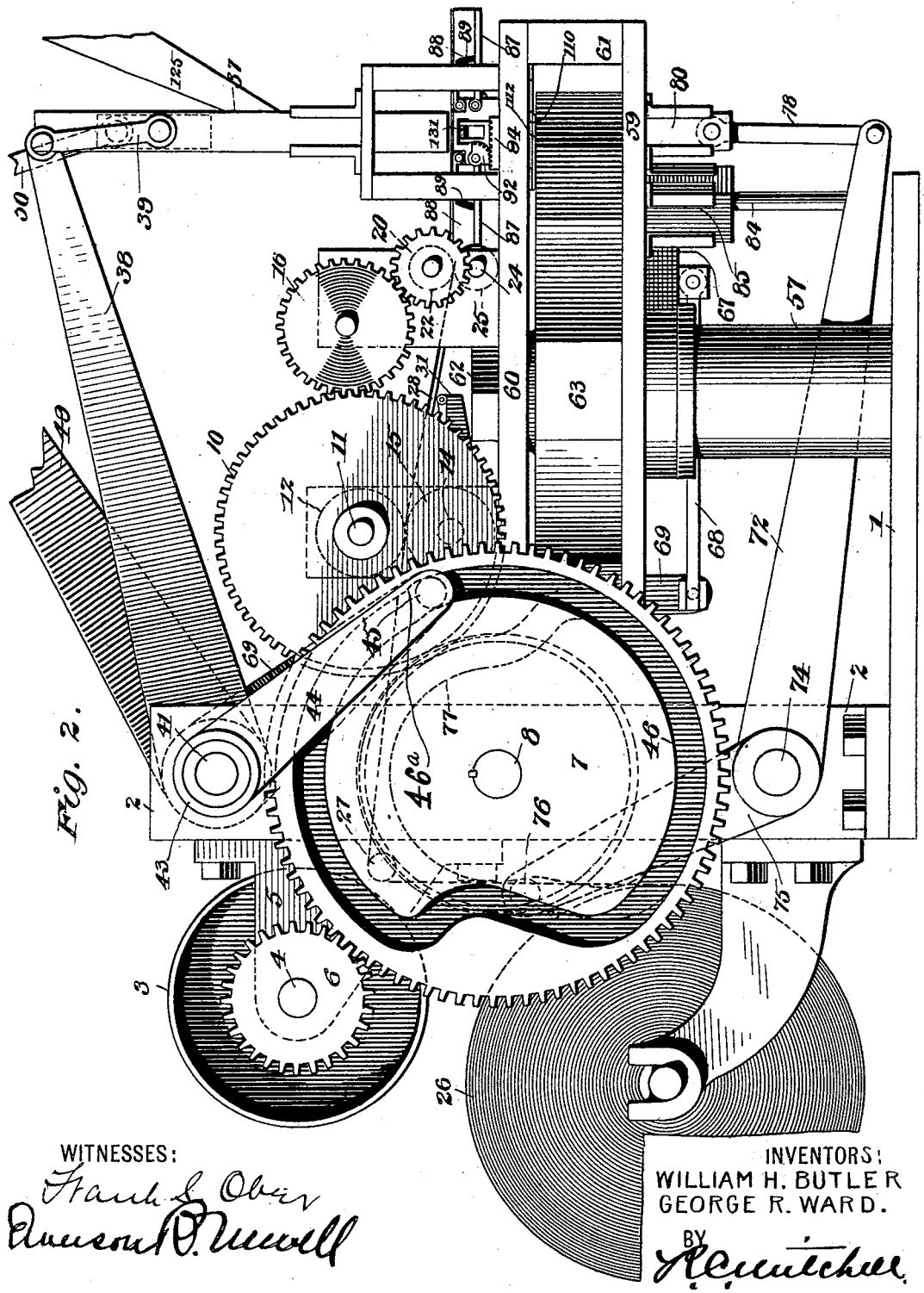

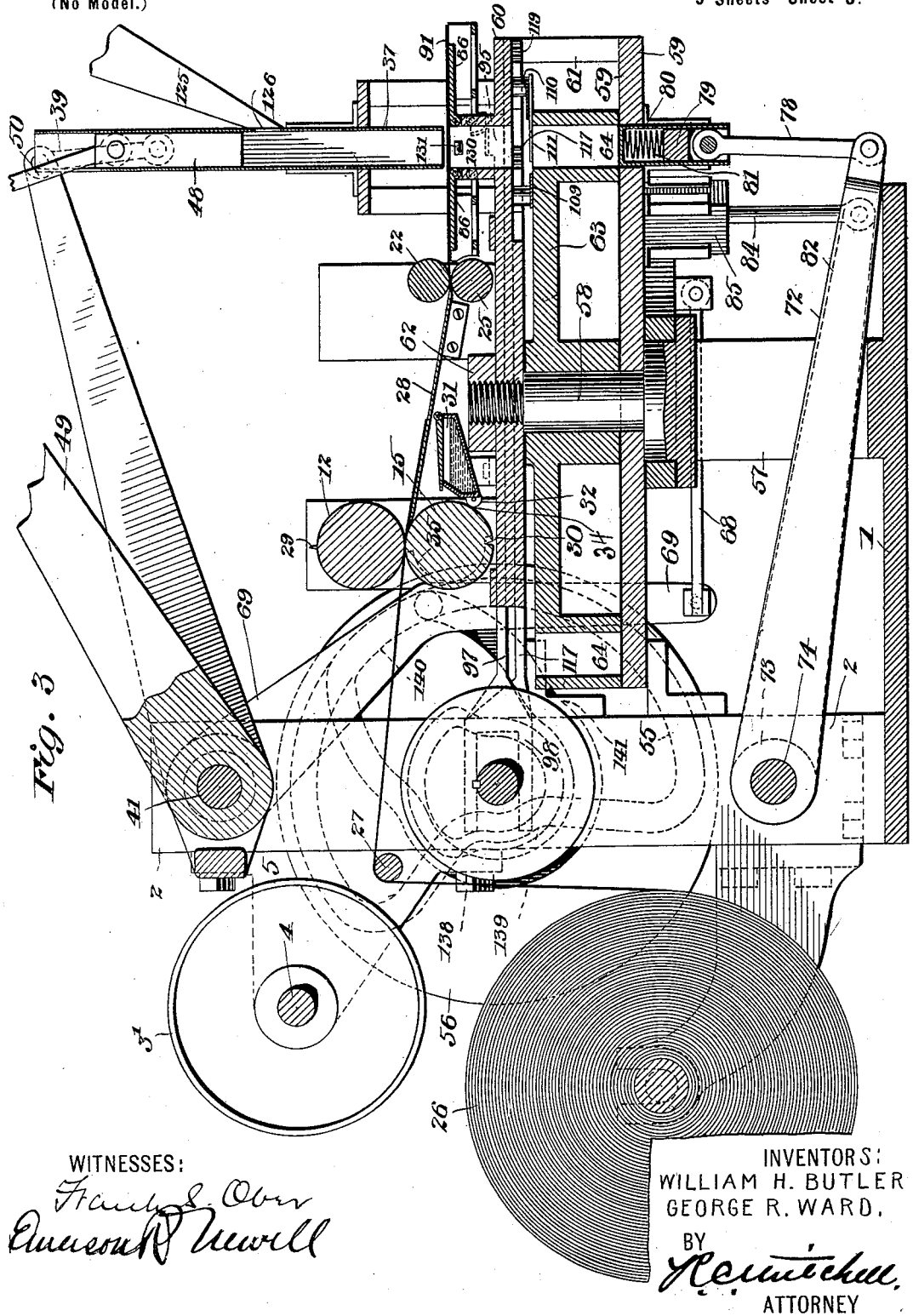

No. 646,355. Patented Mar. 27, 1900.
W. H. BUTLER & G. R. WARD.
BAG MAKING AND FILLING MACHINE.
(Application filed Sept. 8, 1898.)
(No Model.) 9 Sheets—Sheet 4.
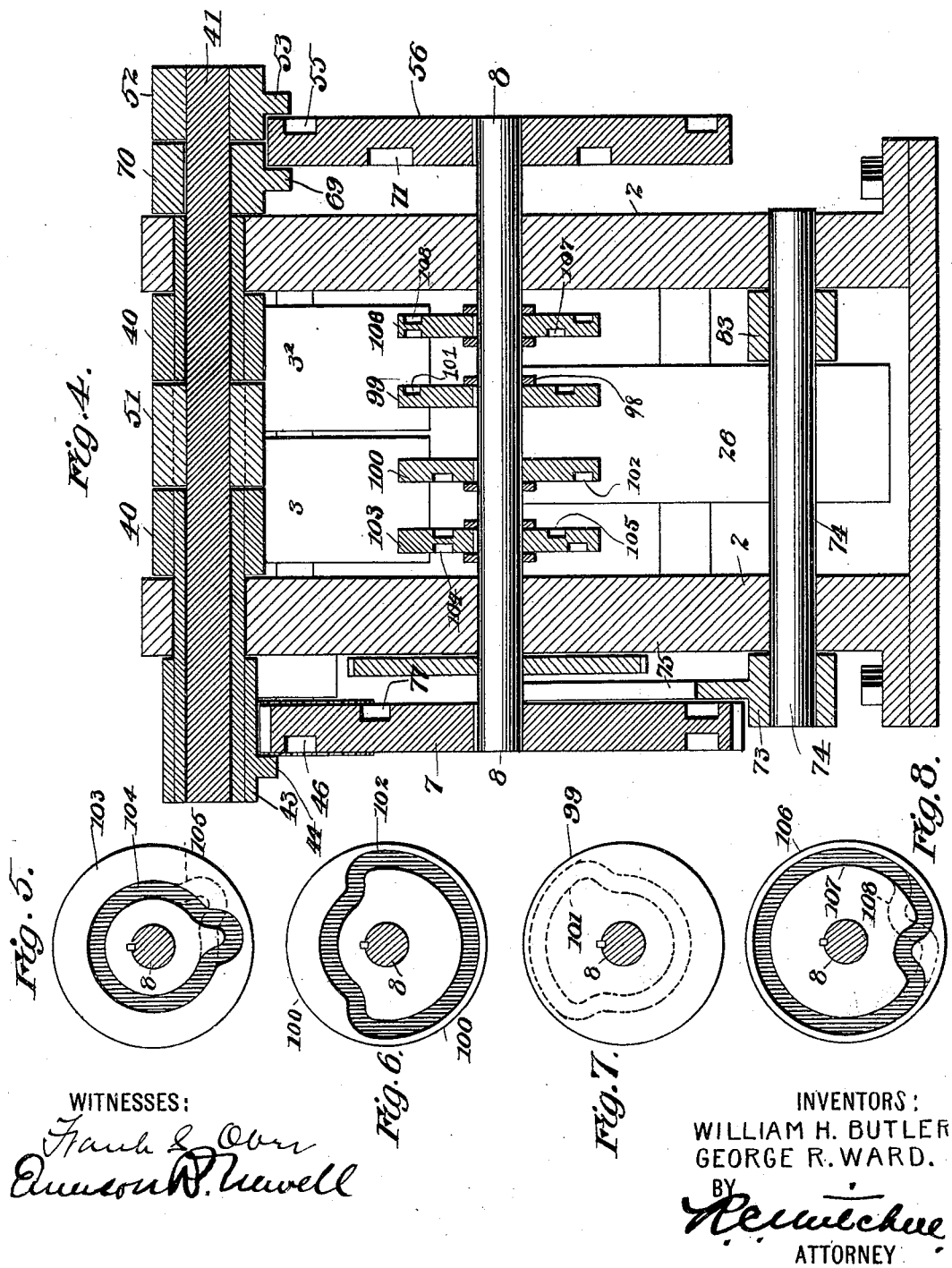
WITNESSES:
INVENTORS:
WILLIAM H. BUTLER
GEORGE R. WARD.
BY
ATTORNEY No. 646,355. Patented Mar. 27, 1900.
W. H. BUTLER & G. R. WARD.
BAG MAKING AND FILLING MACHINE.
(Application filed Sept. 8, 1898.)
(No Model.) 9 Sheets—Sheet 5.
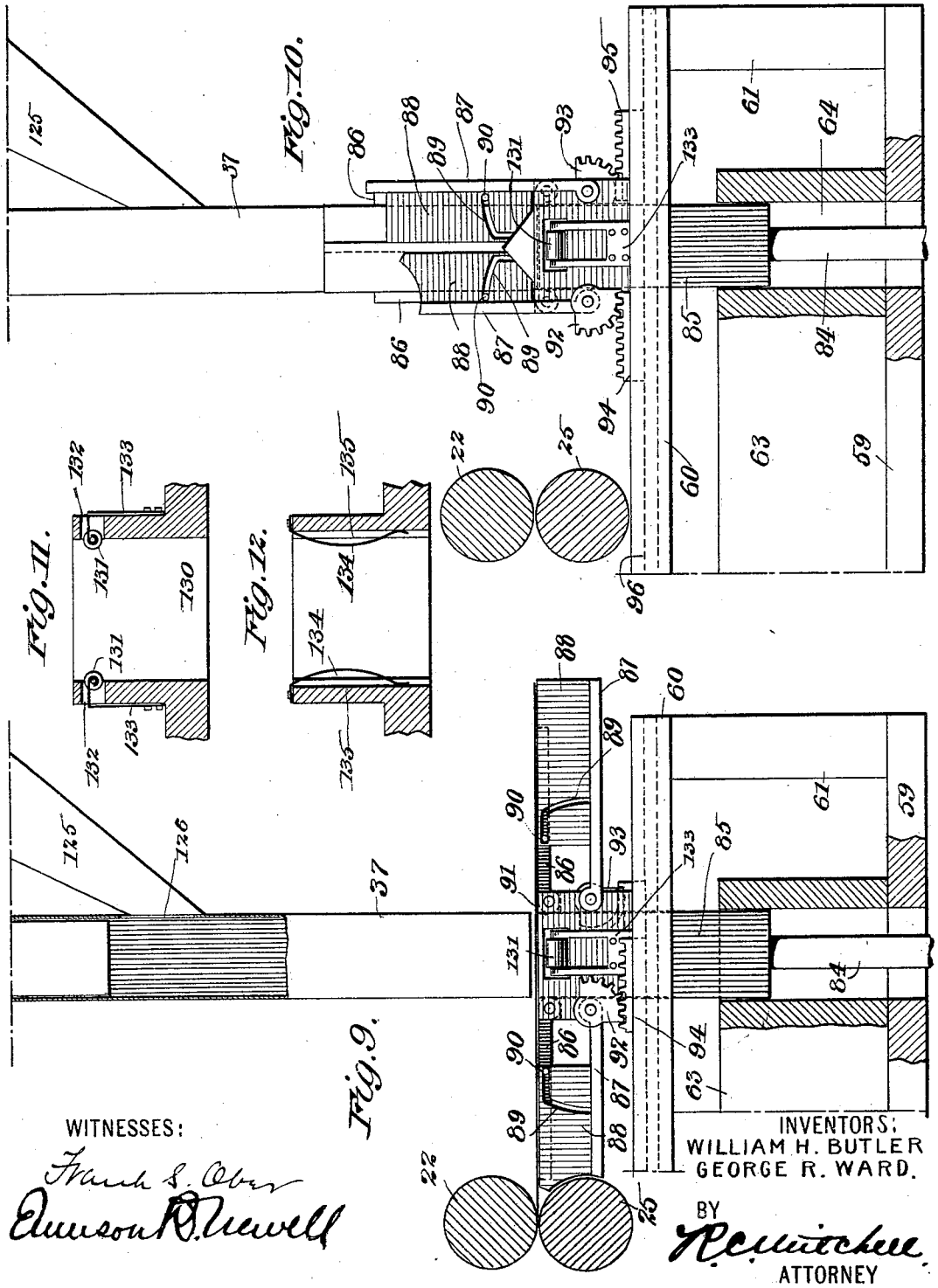

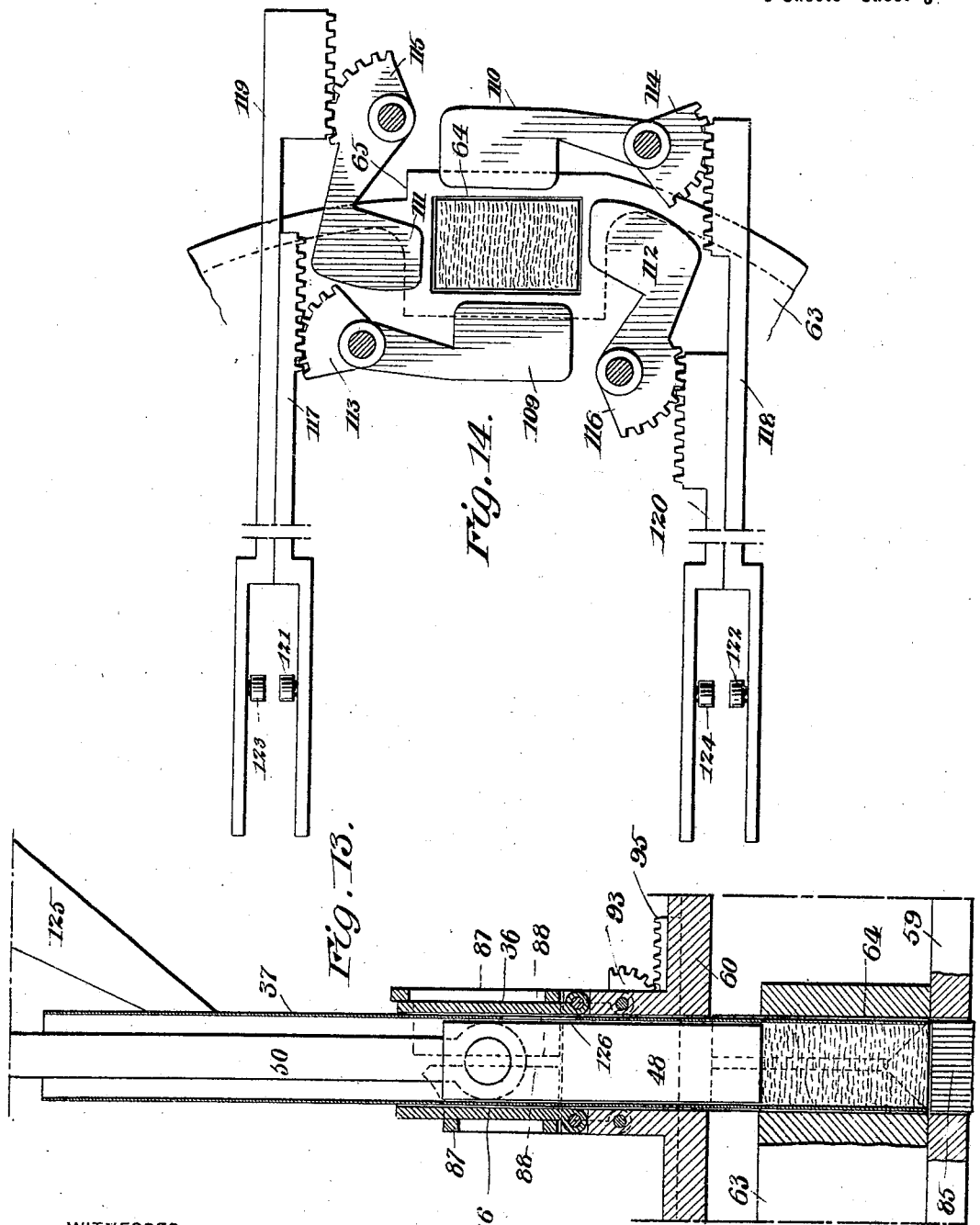

No. 646,355. Patented Mar. 27, 1900.
W. H. BUTLER & G. R. WARD.
BAG MAKING AND FILLING MACHINE.
(Application filed Sept. 8, 1898.)
(No Model.) 9 Sheets—Sheet 7.
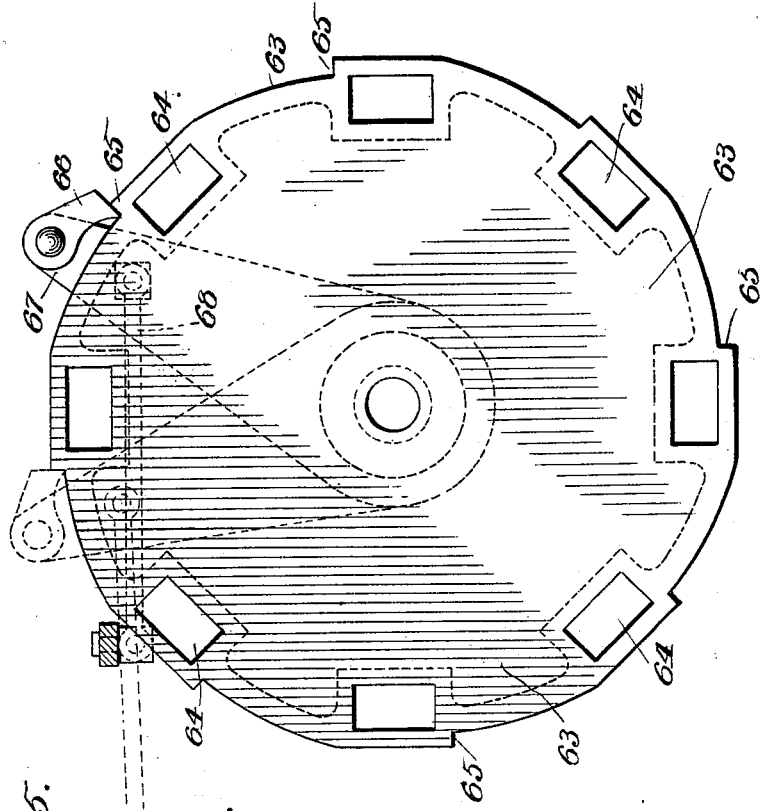
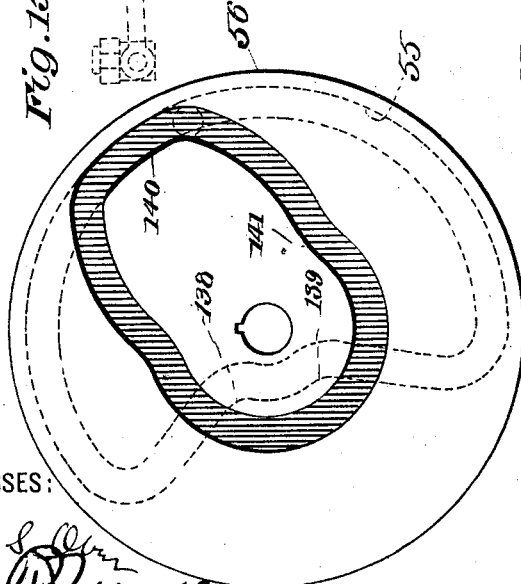
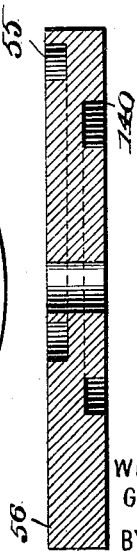
WITNESSES:
INVENTORS:
WILLIAM H. BUTLER
GEORGE R. WARD.
BY
ATTORNEY

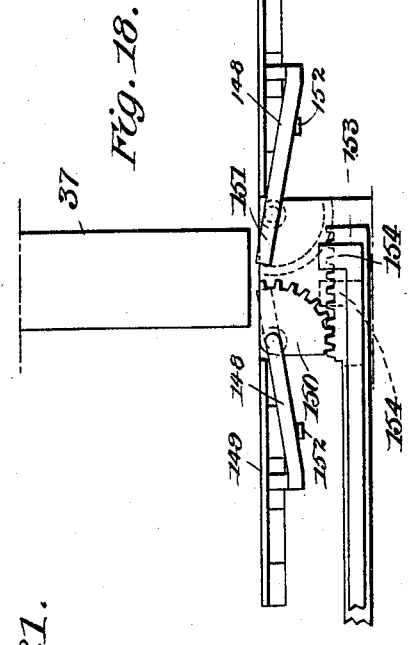

No. 646,355. Patented Mar. 27, 1900.
W. H. BUTLER & G. R. WARD.
BAG MAKING AND FILLING MACHINE.
(Application filed Sept. 8, 1898.)
(No Model.) 9 Sheets—Sheet 9.
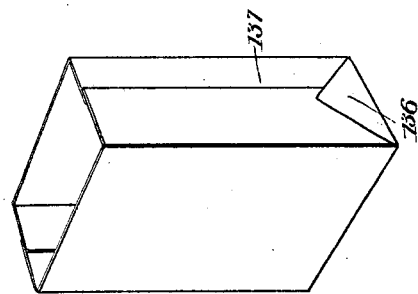
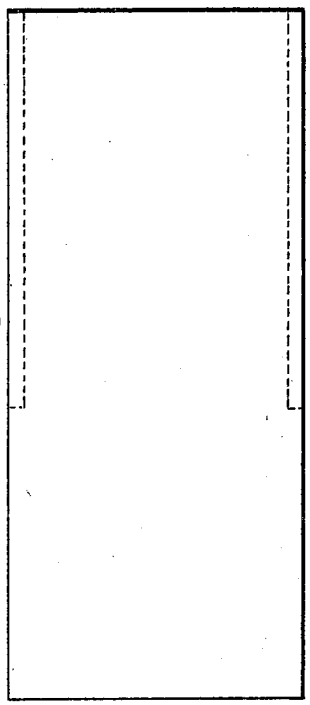
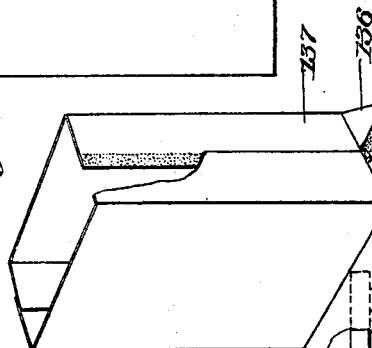
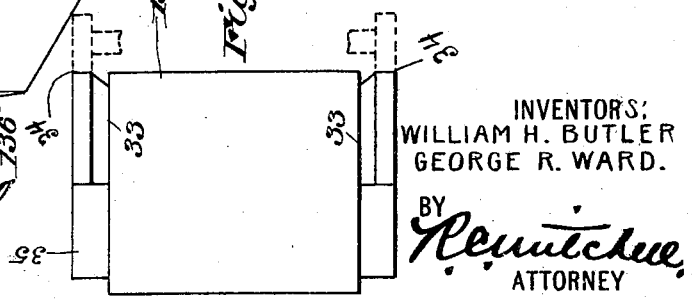
WITNESSES:
INVENTORS:
WILLIAM H. BUTLER
GEORGE R. WARD.
BY
ATTORNEY

UNITED STATES PATENT OFFICE.

WILLIAM H. BUTLER AND GEORGE R. WARD, OF NEW YORK, N. Y.

BAG MAKING AND FILLING MACHINE.

SPECIFICATION forming part of Letters Patent No. 646,355, dated March 27, 1900.

Application filed September 8, 1898. Serial No. 690,477. (No model.)

*To all whom it may concern:*

Be it known that we, WILLIAM H. BUTLER and GEORGE R. WARD, citizens of the United States, residing at New York city, county of New York, State of New York, have invented certain new and useful Improvements in Bag Making and Filling Machines, of which the following is a full, clear, and exact description.

Our invention relates to the art of bag making and filling; and our object is to provide a machine which will form a bag or box new in itself, fill the same with a desired material, and deliver the same ready to be shipped.

Other advantages will appear from the following description of the preferred embodiment of our invention, in which—

Figure 1 shows a plan view of our present machine for making and filling the bag. Fig. 2 shows a side elevation of the same. Fig. 3 shows a sectional view of Fig. 1 on line $x$ $x$ looking in the direction of the arrows. Fig. 4 shows a transverse view of Fig. 1, taken on the line $y$ $y$, looking in the direction of the arrow. Figs. 5, 6, 7, and 8 are detailed views of cam-wheels. Fig. 9 is an enlarged side view, parts being broken away, of the bag-forming means shown in the open position ready for operation. Fig. 10 is a similar view, but showing the bag-forming means closed. Figs. 11 and 12 are detailed views, Fig. 12 being a modification of the means for pressing together the seams of the bag. Fig. 13 is a central vertical view of Fig. 10 with the bag and plungers in a different position. Fig. 14 shows in plan view the means for folding in the end of the bag after it has been filled. Fig. 15 is a side view, and Fig. 16 is a sectional view, of one of the cam-wheels. Fig. 17 is a turn-table for holding the box. Figs. 18, 19, and 20 are detailed views of a modification of the bag-forming mechanism. Fig. 21 is a detailed view, parts being broken away, of the bag-ejecting means. Fig. 22 is a detailed view of the pasting-rollers. Fig. 23 is a plan view of the sheet from which the bag is formed, the parts covered with paste being inclosed by dotted lines. Fig. 24 is a view of the same sheet with the folds or creases shown in heavy lines. Fig. 25 is a perspective view of the partly-formed bag, and Fig. 26 is a view of the complete bag.

In the accompanying drawings, 1 is the base supporting our machine, from which extend uprights 2 2.

3 is a driving-pulley, and 3' a loose pulley, carried on the axle 4, supported in extensions 5 5 from the uprights 2 2. On one end of the axle 4 is carried a toothed gear-wheel 6, which meshes with a larger-toothed wheel 7, carried on the end of an axle 8, also supported by said uprights. 9 is a second gear-wheel carried on said axle 8 and meshing with a gear-wheel 10, carried by an axle 11, supported on the machine, which axle also carries the friction-roller 12 and at the other end a second gear-wheel 13, which meshes with a corresponding gear (not shown) carried on an axle 14, situated below it, which axle 14 also carries a friction-roller 15. Gear-wheel 10 meshes with a smaller gear-wheel 16, carried on an axle 17, which axle also carries a gear-wheel 18, the teeth of which are cut away over part of the periphery, as shown at 19, and the teeth on this wheel mesh with the teeth on a gear-wheel 20, carried on an axle 21. This axle 21 carries a friction-roller 22 and at the opposite end a gear-wheel 23, which meshes with a corresponding gear-wheel (not shown) on an axle 24, situated below it, which last axle carries a second friction-roller 25.

26 is a roll of paper from which the bag is to be made, carried in the supports, as shown, and adapted to pass over an idle roller 27, between the friction-rollers 12 and 15, which slightly grip it, onto the table 28 to the friction-rollers 22 and 25. The roller 12 is provided with a knife-edge 29 (see Fig. 3) and the roller 15 with a corresponding slit 30, into which this knife projects when the rollers are rotated and which will then cut off a certain amount of paper at each rotation of the pair of rolls.

31 is a receptacle for paste, which has feed-rollers 32 at its lower corners, onto the periphery of which a paste is fed by means of apertures in said receptacle or in any other desired manner. The pasting-roller 15 is cut away in the form of a circular notch near each end, as shown at 33, Fig. 22, to prevent paste from creeping over the rest of the face of the roller, and the periphery of the roller remaining outside of each of these notches, as shown at 34, is cut away for a certain distance, as shown at 35, Figs. 3 and 22. The paste-feeding rollers 32 normally contact with part of the periphery of the pasting-roller 15, as shown at 34 in Figs. 3 and 22; but when the cut-away portion 35 comes opposite to the feed-rollers a space is left between the two, and consequently the roller 15 will have paste applied to it only over that portion of its periphery touched by the rollers 32. As the paper is drawn through the rolls 12 and 15 this paste will be applied to the edges thereof in accordance with the length of the uncut-away portion of the pasting-faces 34, as shown in Fig. 23. As the pasted sheet is pushed along the table 28 and cut off it is grasped by the rollers 22 and 25 and drawn along by them. It will be observed, however, that the gear-wheels 16 and 18 are made smaller than gear-wheel 10, as a consequence of which they will have a greater angular speed than said wheel. While the cut-away part of 19 is passing over the wheel 20 said wheel 20 will not be moved; but as soon as the sheet of paper reaches the rolls 22 and 25 the first of the teeth on the wheel 18 will have reached the periphery of wheel 20, when said wheel, and therefore the rolls 22 and 25, will be at once rotated and at a rapid rate, which will draw the pasted sheet quickly therethrough and slide it onto the face-plates 86 of the bag-forming means, as shown in Fig. 3.

37 is a form, in this embodiment a shell, around which the bag is formed, and is reciprocated vertically by arms 38 and links 39. These arms 38 are carried by sleeves 40, loosely inclosing a shaft 41, carried by the uprights 2 2, as shown in Fig. 4. The sleeves 40 are connected by a bridge 42. From the collar 43 on the sleeve 40 projects an arm 44, carrying on the outer end thereof a pin 45, which engages with a cam-groove 46 in gear-wheel 7. 48 is a plunger working inside of this shell 37 and operated by an arm 49 and link 50. This arm 49 is carried by a sleeve 51, fixed on the shaft 41, and said shaft carries at one end a collar 52, fixed thereon, from which extends an arm 53, (shown merely in section in Fig. 4,) which carries a pin engaging in a cam-groove 55 in a cam-wheel 56, carried on the other end of shaft 8.

57 is a slotted post extending up from the base 1 and reduced at its upper end to an extension 58, so as to form a shoulder upon which rests a stationary frame composed, preferably, in part of a plate 59, a second plate 60, and suitable spacing-posts 61. This frame is held in position by a nut 62 screwing upon the threaded portion of the extension 58. Between the plates 59 and 60 and rotating about the extension 58 as a center is a turn-table 63, which has openings 64 cut therein to receive a bag and shoulders 65 to be engaged by a pawl 66. This pawl is pivoted on the end of and carried by an arm 67, rocking upon the post 57, as shown in Fig. 17. The motion of this arm 67 is controlled by a link 68, pivoted thereto at one end and at the other to an arm 69, carried by a sleeve 70, loosely surrounding shaft 41. This arm 69 carries a pin which engages with the cam-groove 71 in a cam-wheel 56, the rotation of which serves to actuate this mechanism to rotate the turn-table at the proper intervals.

72 is an arm carried by a collar 73, fixed on a shaft 74 in uprights 2 2, which collar also carries an arm 75, carrying a pin 76 at its end, which engages with the cam-slot 77 in gear-wheel 7. This arm 72 is provided at its outer end with a link 78, carrying a block 79, surrounded by a shell 80, between which and said block is a coiled spring 81, the whole forming a spring-supported plunger passing through an aperture in plate 59 into one of the holes in the turn-table and serving to yieldingly support a bag. 82 is a second arm carried on a collar 83, also fixed to said shaft 74, which arm carries at its outer end a link 84, carrying a plunger 85, passing through a second hole in plate 59 and into a second aperture in the turn-table, so as to force a bag therefrom.

The present construction ejects the bag in an upward direction; but it is obvious that the direction of ejection is not material to this invention.

Referring to Figs. 9 and 10, showing the bag-forming mechanism, 86 are swinging plates pivoted, as shown, to a hollow extension 130 from the frame, so that when thrown up to their vertical position, as in Fig. 10, they will lie flat against the shell 37. 87 87 are a second pair of swinging plates pivoted to the extension, as shown, and adapted when thrown into their upright position, as shown in Fig. 10, to lie flat against the rear face of the plates 86. These plates 87 carry side plates 88, which stand in a position at right angles to plates 87 and are adapted when in their upright position, as shown in Fig. 10, to fit around the sides of shell 37. Plates 88 are provided with slots 89, and the plates 86 are provided with pins 90, extending thereinto, to guide plates 86 in their motion. Segmental gears 92 and 93 are fixed to the plates 87 and actuate the same and are themselves engaged and actuated by racks 94 and 95. These racks are carried on the ends of sliding rods 96 97, (shown in dotted lines in Fig. 3,) one of which (not shown) carries the rack 94, and the other of which, 97, carries the rack 95. These rods are each formed at their inner ends into a fork 98, embracing shaft 8. 99 is a wheel fixed on the shaft 8 and having a cam-groove 101, into which projects a pin on the sliding rod 97. 100 is a wheel also fixed on shaft 8 and having a cam-groove 102, into which projects a pin on sliding rod 96. As the shaft 8 is rotated clockwise the cams will throw one of the rods inward or to the left and rod 97 outward or to the right.

Referring to Fig. 4, 103 is a wheel fixed on shaft 8 and having cam-grooves 104 and 105. 106 is another wheel fixed on shaft 8 and having cam-grooves 107 and 108. 109, 110, 111, and 112 are reciprocating folders arranged as shown in Fig. 14 and pivoted to the plate 60, as shown in Fig. 3, each of which is provided with toothed segments 113, 114, 115, and 116. 117, 118, 119, and 120 are slide-rods supported by the plate 60, one of which is shown in Fig. 3, which carry at their outer ends racks engaging with toothed segments, and at their inner ends are formed into forks embracing shaft 8, similar to forks 98. These forks carry pins 121, 122, 123, and 124, engaging, respectively, with the cam-slots 107, 104, 108, and 105. As the shaft is rotated clockwise, as seen in Figs. 2 and 3, the cam-grooves in wheels 103 and 106 will engage, first, slide-rod 117; second, rod 118; third, rod 119, and, fourth, rod 120. These motions will successively reciprocate the folders 109, 110, 111, and 112, which will fold in the top of the bag.

125 is a chute through which the material to be inserted in the bags is fed, and 126 is a hole in the side of shell 37, registering, when in the position shown in Figs. 2 and 3, with this chute.

Fig. 11 shows a device for rolling the seams of the bag. 131 are rollers held in apertures 132 in the upper end of the extension 130 by springs 133.

Fig. 12 shows a slight modification of this construction in that springs 134 take the place of the rollers, which springs may be pressed back into recesses 135.

The operation of the device is as follows: On rotating the shaft 8 clockwise the rollers 12 and 15 will be rotated in opposite directions and will pull through and cut off a sheet for a bag, at the same time applying paste to a portion of the edges thereof, as heretofore described. The rolls 22 and 25 will then grasp the sheet and push it quickly onto the plates 86. The machine will then be in the position shown in Figs. 1 and 2. Upon a further slight rotation of said shaft the arm 44 will be by the slight bend 46ᵃ in the slot 46 moved slightly to the left, which will drop the arm 38, and consequently the shell 37, so that it will rest upon the sheet 91. By this time the cam-slot 77 will have acted on arms 75 and 72 and have raised the spring-supported plunger up against the sheet 91, which will then be held between said plunger and the lower end of shell 37. The wheels 99 and 100 are in such a position at this moment that the cam-grooves therein will immediately act upon the slide-rods 96 and 97, throwing the one inwardly or to the left and the other outwardly or to the right, which will throw the racks 94 and 95 in opposite directions and throw the plates 86 and 87 into their upright position, as shown in Fig. 10. As the plates 86 rise they will fold the parts of the sheet projecting to the right and the left of the sides of the shell 37 up against the sides of said shell, and as the plates 87 rise toward their vertical position the vertical side plates 88 will fold in the projecting sides of the sheet over the remaining sides of the shell 37, as shown in Fig. 26. The formation of the cam-grooves raises plates 86 and 87 at the right of the shell 37 a little before the plates at the left thereof, which will result in folding the unpasted edge over the pasted edge. The plates will then drop back to their former position. The cam-slot 46 will force the shell 37 downwardly, which will carry with it the partially-completed bag down into the hollow extension 130. As the bag starts down through this opening the triangular bottom folds or extensions 136, as shown in Fig. 26, will be turned up against the sides 137 of the bag, as shown in Fig. 27, and the rollers 131 will pass over the pasted edges and more firmly unite them. The shell 37 will continue to drop and will close the opening 126 into the hopper, which will by this time have admitted a definite quantity of material into the shell, which material will drop into the now formed bag. As the bag and shell drop into the opening in the turn-table directly underneath, the spring-supported plunger will also drop while supporting the bag. The arm 49, actuating the packing-plunger 48, will then be forced downward through the action of the cam-groove 55, and the material will be pressed down in the bag. All this time the material will be inside of the shell, outside of which is the bag. When the pin which actuates arm 49 and the packing-plunger reaches the point 138, as shown in Fig. 15, it will not be moved till it reaches the point 139, and consequently during this short interval the packing-plunger will remain at rest pressed down upon the material inside of the shell and bag, as shown in Fig. 13. The cam-groove 46 will, however, commence to raise the shell 37, which will slide upward over the now stationary packing-plunger and will be drawn up away from contact with said material before the action of the cam at the point 139 raises the packing-plunger from off the material in the bag. This is a specially-advantageous feature, for if the packing-plunger were not allowed to rest upon the material while the shell is being withdrawn the shell would be liable to displace the bag or material, or both, and possibly carry the material, or both, bodily out of the mold. By this construction, however, the material is kept securely in the bag until the shell is withdrawn. When we say that the shell or plunger is raised from the bag or from the filling material, we merely mean that the parts are moved relatively to each other. It will be obvious that if the bag were drawn off from a stationary shell the same result might be produced. If desired, the plunger may compress said material. The cam-groove 55 then withdraws the packing-plunger. The cam-wheels 103 and 106 now operate the slide-rods 117, 118, 119, and 120, which successively operate folders 109, 110, 111, and 112. This completes the operation of making the bag, filling the same, and folding the ends. While this operation has been going on, the pin 70 on the arm 69 has moved along through the cam-groove 140 to the point 141, which has drawn back the arm 67 and pawl 66 from the position shown in full lines in Fig. 17 to the position shown by dotted lines therein. On the further movement of the wheel 56 the arm 69 will be thrown to the right, which will move the arm 67 and the pawl 66, now in engagement with one of the shoulders 65, to the right into the position shown in full lines in Fig. 17, which will rotate the turn-table, so that the filled and folded bag will be carried around horizontally and will present a new aperture in the turn-table under the shell 37 and a second new aperture over the ejecting means, and the machine will be again in the position shown in Figs. 1, 2, and 3. The ejecting means will operate at the same time with the rise of the arm 72 and spring-supported plunger, which will eject one bag, as before described. As this operation goes on the bags will be filled, folded, and carried around by the turn-table through nearly a complete circle till they reach the ejecting means, where they may be removed by hand or otherwise after they have been raised from the turn-table.

Figs. 18, 19, and 20 show the modified means for forming the bag. 143 are plates having perforated ears 144 and 145, embracing a perforated ear 146 on the extension 130, through which perforations loosely passes the pivot-rod 147, which has extensions 148 passing down and up and abutting against the under side of wings 149, pivoted to the sides of plate 143, as shown in Fig. 20. At one side the plate 143 carries a segment 150, fixed to it. On the opposite side the arm 148 is extended into the lug 151. 152 are bars on the under side of and fixed to the plates 143 and projecting out underneath the extensions 148, so that when the plates 143 are raised by the segments the extensions 148 will also be raised without folding in the wings 149. Racks 153, actuated in opposite directions by cam-wheels on shaft 8, operate the toothed segments 150 and raise the plates 143 up against the sides of the shell 37 which commence the folding of the bag, very much as in the previously-described operation. When the plates attain this position, the lugs 154 on the slide-rods are thrown in opposite directions by cam-wheels and strike against the lugs 151 on the end of the extension 148, which will throw the upper ends of the extensions toward each other and fold the wings 149 against the remaining sides of the shell 37, forming the bag shown in Fig. 26, and in much the same way as in the former operation.

In regard to the bag itself it will be seen that by our machine we form a bag which has a solid bottom — i. e., one without seams. The side folds forming the side 137 extend down to the bottom and the bottom fold 136 is turned up outside the main portion of the bag and against the side thereof. This makes a bag which is very strong and which has no folds on its inner side to catch the material in the bag or to work open and allow said material to leak out.

Many other advantages will appear from our construction, and it will be evident that very many modifications of the device herein described and shown may be made without departing from the spirit of our invention.

What we claim is—

1. In a bag-making machine in combination, a frame having an aperture therein, a reciprocating form adapted to pass thereinto, means to feed a bag material thereto, means to fold said material around said form, and means to then pass said form and bag into said aperture and thereby compress the seams so formed, and means to withdraw said form from said bag.

2. In a bag-making machine in combination, a frame having an aperture therein, a reciprocating shell adapted to pass into the same, means to feed a bag material thereto, means to fold said material over said shell, means to move said shell and bag into said aperture thereby completing said bag, means to raise said shell from said bag, and a plunger reciprocating in said shell and adapted to hold said bag after said shell starts to rise.

3. In a bag-making machine in combination, a frame having an aperture therein, a reciprocating shell adapted to pass into the same, means to feed a bag material thereto, means to fold said material over said shell, and means to move said form and bag into said aperture, the sides of said aperture thereby completing said bag, and means to fill said bag through said shell.

4. In a bag-making machine in combination, a shell, means to feed a bag material over the end of same to form the bottom of the bag leaving the same projecting from two adjacent sides thereof, means to fold said projecting parts of said material against said two adjacent sides of said shell so as to leave an outside extension, and means to fold said outside extension against the outside of the bag, means to fill said bag through said shell and means to withdraw said shell from said bag.

5. In a bag-forming machine in combination, an elongated form having two sides opposite to each other and an intermediate side, means to feed a bag material over the end of said form leaving part of said material projecting from said three sides of said form, means to fold up against said opposite sides the parts of said material projecting from said opposite sides and also against the intermediate side, the edges of said portions overlapping on said intermediate side and leaving a triangular projection from said intermediate side at the end of said form, means to then fold said triangular piece against the outside of said bag, and means to complete said bag.

6. In a bag-making machine in combination, a shell, means to feed a bag material over the end of the same, means to hold part of said material fast over said end and means to fold another part of said material over the sides of said shell, and means to fill said bag through said shell.

7. In a bag-forming machine in combination, a frame having an aperture therein, a reciprocating shell adapted to pass into the same, means to feed a bag material to, and to hold it fast over, the end of said shell, means to fold said material over said shell, means to move said shell and bag into said aperture thereby completing said bag, and means to admit a filling material into said bag through said shell.

8. In a bag-making machine in combination, a reciprocating form, means to feed a bag material over the end of same leaving said bag material projecting from each side of said form, means to hold it thereto, pivoted plates adapted to be moved against said form and simultaneously fold said material against two adjacent sides thereof, and automatic means to fold the material projecting from the remaining sides of said form against said form to complete said bag.

9. In a bag-making machine in combination, a frame having an aperture therein, a reciprocating form adapted to enter said aperture, means to feed a bag material over said aperture and between it and said form and a plate pivoted to said frame near said aperture and adapted to swing against said form above said aperture and fold said bag material around the same, said form adapted to enter said aperture and thereby complete said bag.

10. In a bag-making machine in combination, a form having two opposite sides, and a side intermediate between the same, means to feed a bag material to said form, means to apply a paste along more than one-half of one under edge thereof, means to fold said material over said opposite sides and intermediate side thereby producing a solid bottom and leaving a triangular projection at said intermediate side, the portions of said material overlapping on said intermediate side and fastened by said paste, means to fold said triangular projection up over said overlapped seam, and means to complete said bag.

11. In a bag-making machine in combination, a hollow shell having two opposite sides and a side intermediate between the same, means to feed a bag material to said shell, means to apply a paste along more than one-half of one under edge thereof, means to fold said material over said opposite sides and intermediate side thereby producing a bag having a solid bottom and a triangular projection at said intermediate side, the portions of said material overlapping on said intermediate side and fastened by said paste, means to fold said triangular projection up against said overlapped seam, means to separate said bag from said shell, a reciprocating plunger in said shell adapted to hold said bag in position when said bag and shell are separated, and means to complete said bag.

12. In a bag-making machine in combination, a form having two opposite sides and an intermediate side, means to feed a bag material over the end of said form, means to apply a paste along more than one-half of one under edge thereof, means to fold said material simultaneously over one of said two opposite sides and said intermediate side, means to fold another portion over the other of said two opposite sides and said intermediate side, said two portions overlapping on said intermediate side and fastened by said paste, thereby producing a bag having a solid bottom and a triangular projection at said intermediate side, means to fold said triangular projection up against said overlapped seam, and means to complete said bag.

WM. H. BUTLER.
GEORGE R. WARD.

Witnesses:
W. D. JUDKINS,
EMERSON R. NEWELL.